Figure 1:
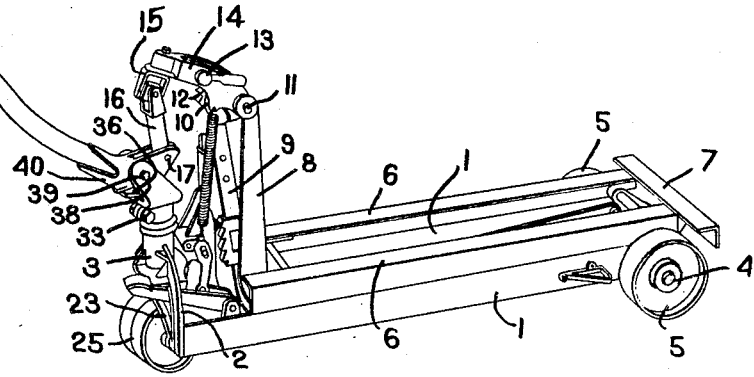

Sept. 1, 1931.        D. E. HENNESSY        1,820,942
HAND TRUCK WITH TONGUE OPERATED BRAKING MECHANISM Filed June 12, 1929

Inventor.
Daniel E. Hennessy
by Heard Smith & Tennant.
Attys.

Patented Sept. 1, 1931

1,820,942

UNITED STATES PATENT OFFICE

DANIEL E. HENNESSY, OF WATERTOWN, MASSACHUSETTS, ASSIGNOR TO LEWIS-SHEPARD COMPANY, OF WATERTOWN, MASSACHUSETTS, A CORPORATION OF MASSACHUSETTS

HAND TRUCK WITH TONGUE OPERATED BRAKING MECHANISM

Application filed June 12, 1929. Serial No. 370,408.

This invention relates to improvements in hand trucks and more particularly to hand operated elevating trucks having upwardly movable load supporting means adapted to be elevated after the truck is introduced beneath the platform, thereby raising the load supporting means and the platform and load which is supported upon it.

Hand trucks of heavy load-carrying capacity are in extensive commercial use. Frequently the heavily loaded trucks are drawn down inclines of sufficient pitch to make it difficult for the operator of the truck to control the movement of the truck. One of the principal objects of the present invention is to provide braking mechanism operable by a vertical movement of the steering tongue to apply the brake.

A further object of the invention is to provide a braking mechanism operable by a vertical swinging movement of the tongue when the tongue is in any steering position.

A further object of the invention is to provide a braking mechanism which will be applied by the weight of the tongue when the operator releases the tongue, thereby preventing the truck from "running away" when left upon more or less of an inclined roadway.

A further object of the invention is to provide an elevating truck having load supporting means, steering mechanism including a tongue mounted to swing vertically, and means operable by a vertical swinging movement of the tongue to raise the load supporting means either by a single swinging movement of the tongue, or preferably step by step with means operable by a predetermined vertical movement of the tongue to apply a brake preferably to the steering wheel or wheels.

Another object of the invention is to provide a novel and simplified steering mechanism comprising a head having a vertical cylindrical journal, a steering post mounted within said journal with the yoke for the steering wheel welded to the lower end of the steering post.

A further object of the invention is to provide a simplified steering mechanism of the character above described having a hollow steering post welded to the yoke of the steering wheel, braking mechanism, and means for exerting power axially of the hollow steering post to apply the brake.

These and other objects and features of the invention will more fully appear from the following description and the accompanying drawings and will be particularly pointed out in the claims.

A preferred embodiment of the invention is illustrated herein as applied to an elevating truck of the well known "Lewis-Shepard" type illustrated, for example, in Patents No. 1,445,838 granted to Lewis-Shepard Company as assignee of Ralph M. Lovejoy, and No. 1,700,382 granted to Lewis-Shepard Company as assignee of Frederick J. Shepard, Jr. While the hand trucks illustrated in these patents are elevating trucks operable to raise the load supporting means step by step, it will be obvious that the principles of the present invention may also be embodied in single lift trucks, or in trucks in which no means are provided for raising the platform or other load supporting means.

Figure 2:
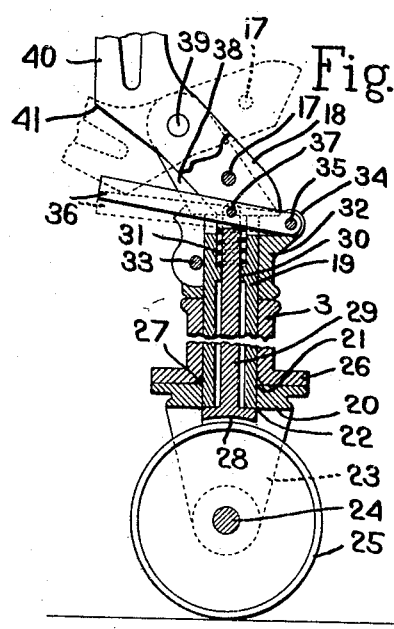

In the drawings:

Fig. 1 is a perspective view of an elevating truck embodying the invention; and, Fig. 2 is a detail view of the steering mechanism showing the steering head, steering post, and braking mechanism in vertical section.

The elevating truck illustrated in the accompanying drawings is similar to the elevating trucks illustrated in the patents to Lovejoy and Shepard respectively above mentioned and comprises a main frame having side bars 1 connected at their front ends by a yoke-shaped head 2 having a central vertical hollow boss 3 in which the steering post is mounted. The rear end of the side frame bars 1 are carried by an axle 4 upon which the rear wheels 5 are mounted.

The load supporting means or platform comprises side bars 6 which desirably are of angle iron connected at their rear ends by a transverse bar 7 and at their front ends by a substantially vertical standard 8.

The mechanism for raising the load supporting means relatively to the frame may be and desirably is similar to that illustrated in the patents to Lovejoy and Shepard respectively, comprising a link 9 connected at its upper end to a sector-shaped lever 10 fulcrumed upon a shaft 11 journalled in bosses in the upper end of the platform standard, and connected at its lower end to suitable mechanism for raising and lowering the platform or load supporting means. The sector 10 is, as in the Lovejoy and Shepard constructions, provided with ratchet teeth 12 adapted to be engaged by a pawl carried by a shaft 13 which is rotatably mounted in a lifting lever 14 which is also fulcrumed upon the shaft 11 at the upper end of the platform standard.

The free end of the lever 14 is connected by a universal joint 15 to a strut 16, the lower end of which is pivotally mounted upon a shaft 17 of an extension 18 of the tongue, the strut 16 being movable substantially in the direction of the axis of the steering post and operable upon vertical swinging movements of the tongue, when in any steering position throughout a range of at least 180-degrees, to raise the load supporting means step by step, suitable means being employed to lock the load supporting means at each step of elevation.

When the supporting means is locked in the position of highest elevation, another upward swinging movement of the tongue will lower the lifting lever 14 sufficiently to enable the pawl upon the shaft 13 to drop out of engagement with the lowest ratchet tooth 12 and thereby free the tongue from the other members of the lifting mechanism so that it can be freely moved up and down during the steering of the truck in the manner disclosed in the prior patents aforesaid.

The construction above described is of a usual character.

The present invention relates particularly to improvements in steering mechanism and to braking mechanism operable by a vertical swinging movement of the tongue.

The improved steering mechanism, which is illustrated particularly in Fig. 2, comprises a vertical cylindrical steering post 19 which is rotatably journalled in the hollow boss 3 of the head of the truck, and at its lower end extends through a suitable aperture in the yoke 20 for the steering wheel and is electrically welded by spots or lines of welding 21 and 22 at the upper and lower surfaces of the yoke 20. The yoke 20 is provided with usual arms 23 which support the shaft 24 of one or more steering wheels 25.

By thus extending the steering post through the yoke and welding the same to it at the upper and lower surfaces of the yoke, a very rigid connection of the steering post to the yoke is provided, and furthermore the necessity of accurate machining of these parts is avoided.

The upper face of the yoke 20 is flat and engages the finished under surface of a flange 26 at the lower end of the head. Desirably the wall of the aperture through the head is chamfered at its lower end slightly to provide an annular recess 27 into which the weld 21 at the upper face of the yoke may extend without interfering with the smooth contact between the upper face of the yoke and the under face of the head.

In the preferred construction illustrated herein a brake shoe 28 is located directly over the steering wheel or wheels and is provided with a preferably integral stem 29 which extends upwardly through the hollow steering post 19. Desirably the hollow steering post is provided near its upper end with an internal annular boss 30 upon which the lower end of a spiral spring 31 surrounding the stem 19 is seated. The upper end of the steering post 19 is provided with a collar 32 which preferably is split and is clamped rigidly upon it by a bolt 33. The collar is provided with rearwardly projecting bosses 34 which receive a shaft or pin 35 forming the fulcrum of a lever 36 which extends across the vertical axis of the steering post and desirably is continuously connected to the upper end of the brake stem 29 by a pin 37. The spring 31, which rests at its lower end upon the boss 30, engages the lower face of the lever 36 and normally sustains the brake in elevated inoperative position as illustrated in Fig. 2.

The collar 32, which is secured to the upper end of the steering post, is provided with forwardly extending bosses 38 having near their ends a rod or shaft 39 upon which the tongue 40 is mounted. The extension 18 of the tongue projects over the axis of the steering post and the pin 17, to which the lower end of the strut 16 is attached, is movable by the vertical swinging movement of the tongue substantially vertically of the axis of the steering post.

The tongue is provided with a heel portion 41 which, as illustrated, is substantially in the same plane as the lower face of the extension of the tongue and overlies the free end of the lever 36 of the brake mechanism, so that when the tongue is depressed below normal steering position the heel 41 will engage the lever 36 and depress the same, thereby forcing the stem downwardly and applying the brake 28 to the steering wheel or wheels 25.

By reason of this construction the weight of the tongue, when released by the operator, will exert sufficient pressure upon the lever 36 to apply the brake 28 to the steering wheel 25 with sufficient force to prevent running away of the truck even when it is left upon an inclined roadway.

When the truck is being drawn over a downwardly inclined surface the operator may apply any desired braking force to the steering wheel because of the great leverage which may be exerted through the tongue and further multiplied through the lever 36. Furthermore, this braking force may be applied with the tongue in any steering position, thereby enabling the operator easily to control the speed of a truck bearing a heavy load when running down an inclined surface and avoiding the possibility of accident which otherwise might occur by reason of inability to control the direction of the truck particularly if the steering wheel should strike an obstruction when the truck is moving rapidly.

It will be obvious that the braking mechanism thus embodied in the elevating truck illustrated in the accompanying drawings does not in any way interfere with the lifting of the load step by step in the manner described in the aforesaid patents. It is also obvious that the steering mechanism and also the braking mechanism disclosed herein may be employed in elevating trucks in which the platform is raised by a single swinging movement of the tongue as in usual well known constructions, and it is further obvious that the steering mechanism and brake may be readily embodied in plain trucks in which there is no mechanism for raising the platform, or other load supporting means.

It is, therefore, to be understood that the particular embodiment of the invention shown and described herein is of an illustrative character and is not restrictive of the meaning and scope of the following claims.

Having thus described the invention, what is claimed as new, and desired to be secured by Letters Patent, is:

1. A hand truck comprising load supporting means and steering mechanism including a steering wheel and a tongue mounted to swing vertically, braking mechanism for said steering wheel, and power multiplying means intermediate of said tongue and said brake operable by the weight of said tongue when lowered in any steering position to apply said brake to said steering wheel.

2. A hand truck comprising load supporting means, a steering wheel having a hollow vertical steering post, a tongue pivotally mounted on said steering post to swing vertically, a brake for said steering wheel, and power multiplying means intermediate of said tongue and said brake operable by a vertical movement of said tongue when in any steering position to exert a force axially of said steering post to apply said brake.

3. A hand truck comprising load supporting means, a steering wheel having a hollow vertical steering post, a steering tongue pivotally mounted on said steering post to swing vertically, a brake for said steering wheel having a stem reciprocably mounted in said hollow steering post, resilient means normally holding said brake in released position, and power multiplying means intermediate of said tongue and said brake operable by a vertical swinging movement of said tongue to engage the upper end of said stem and apply said brake to said steering wheel.

4. A hand truck comprising load supporting means, a steering wheel having a hollow vertical steering post, a steering tongue pivotally mounted on said steering post to swing vertically, a brake for said steering wheel having a stem reciprocably mounted in and extending through said hollow steering post, a lever fulcrumed on said steering post and extending across the vertical axis thereof having means engaging the upper end of said brake stem and positioned to be engaged and actuated by a predetermined swinging movement of said tongue to apply said brake.

5. A hand truck comprising load supporting means, a steering wheel having a vertical steering post, a tongue pivotally connected to said steering post to swing vertically, means operable by a vertical swinging movement of said tongue when in any steering position to raise said load supporting means, a brake for said steering wheel, and means operable by a predetermined vertical swinging movement of said tongue when in any steering position to apply said brake.

6. A hand truck comprising load supporting means, a steering wheel having a vertical steering post, a tongue pivotally connected to said steering post to swing vertically, elevating means operable by vertical swinging movements of said tongue to raise said load supporting means step by step with the tongue in any steering position, means for locking the load supporting means at each step of elevation, means for releasing said tongue from said elevating means for steering purposes, a brake for said steering wheel, and means operable by depression of the tongue below normal when in any steering position to apply the brake to said steering wheel.

7. A hand truck comprising a head provided with a central vertical journal, a steering post rotatably mounted in said journal, a yoke welded to the lower end portion of said steering post, a steering wheel mounted in said yoke, a brake for said steering wheel having a stem reciprocably mounted in said cylindrical steering post, a tongue mounted on said steering post to swing vertically, and means operable by depression of the tongue to apply said brake.

8. A hand truck comprising a head provided with a central vertical journal, a steering post rotatably mounted in said journal, a yoke welded to the lower end portion of said steering post, a steering wheel mounted in said yoke, a brake for said steering wheel having a stem reciprocably mounted in said cylindrical steering post, a collar fixedly secured upon the upper portion of said steering post, a lever fulcrumed on said collar extending across the axis of said steering post and engaging said brake stem, a tongue pivotally mounted upon said collar to swing vertically and operable upon depression below normal steering position to engage said lever and actuate the same to apply the brake to said steering wheel.

In testimony whereof, I have signed my name to this specification.

DANIEL E. HENNESSY.